(12) United States Patent
Mizuno et al.

(10) Patent No.: US 11,548,486 B2
(45) Date of Patent: Jan. 10, 2023

(54) ONBOARD SYSTEM AND EMERGENCY BRAKE CONTROL METHOD

(71) Applicant: KYOSAN ELECTRIC MFG. CO., LTD., Yokohama (JP)

(72) Inventors: Kenji Mizuno, Sagamihara (JP); Shuji Nambu, Yokohama (JP); Toshifumi Nishi, Yokohama (JP); Tamotsu Yokoyama, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 249 days.

(21) Appl. No.: 16/364,416

(22) Filed: Mar. 26, 2019

(65) Prior Publication Data

US 2019/0217828 A1   Jul. 18, 2019

Related U.S. Application Data

(63) Continuation of application No. PCT/JP2016/079199, filed on Oct. 3, 2016.

(51) Int. Cl.
*B60T 7/12* (2006.01)
*B60L 3/08* (2006.01)
*B60T 13/66* (2006.01)
*B60T 17/22* (2006.01)

(52) U.S. Cl.
CPC ............ *B60T 7/126* (2013.01); *B60L 3/08* (2013.01); *B60T 13/665* (2013.01); *B60T 17/228* (2013.01)

(58) Field of Classification Search
None
See application file for complete search history.

(56) References Cited

U.S. PATENT DOCUMENTS

| 2007/0100517 A1 | 5/2007 | Km |
| 2013/0317676 A1 | 11/2013 | Cooper et al. |

FOREIGN PATENT DOCUMENTS

| AU | 2013205669 A | 11/2013 | |
| CN | 1809488 A | 7/2006 | |
| EP | 2660121 A1 * | 11/2013 | ............ B61L 25/021 |
| EP | 2660121 A1 | 11/2013 | |
| JP | 1994-327105 A | 11/1994 | |
| JP | H06321099 A * | 11/1994 | |
| JP | H08-33124 A | 2/1996 | |
| JP | 2003040110 A * | 2/2003 | |
| JP | 2007-331558 A | 12/2007 | |
| JP | 2008-152249 A | 7/2008 | |
| JP | 2014-180168 A | 9/2014 | |
| JP | 2015136208 A * | 7/2015 | |

* cited by examiner

*Primary Examiner* — Maceeh Anwari
*Assistant Examiner* — Aarron E Santos
(74) *Attorney, Agent, or Firm* — Muncy, Geissler, Olds & Lowe, P.C.

(57) ABSTRACT

Upon detecting a current balise, an onboard system of a train calculates a speed curve based on measured traveling speed at a timing of the detection and sets a minimum required time period for traveling to each of a next balise and a balise subsequent to the next balise. Upon detecting the next balise, the onboard system compares a traveling time period from the timing of detecting the current balise to the timing of detecting the next balise with the set minimum required time period. The onboard system activates an emergency brake when the elapsed time period is shorter than the minimum required time period to stop the train.

16 Claims, 6 Drawing Sheets

FIG. 4

[MINIMUM REQUIRED TIME PERIOD DATA]       210

|  | BALISE ID (210a) | MINIMUM REQUIRED TIME PERIOD (210b) |
|---|---|---|
| CURRENT BALISE | 005 | — |
| NEXT BALISE | 006 | 10 SEC. |
| BALISE SUBSEQUENT TO NEXT BALISE | 007 | 18 SEC. |

FIG. 6

[MINIMUM REQUIRED TIME PERIOD TABLE] 220

| | | NEXT BALISE | | BALISE SUBSEQUENT TO NEXT BALISE | |
|---|---|---|---|---|---|
| CURRENT BALISE | TRAVELING SPEED | BALISE ID | MINIMUM REQUIRED TIME PERIOD | BALISE ID | MINIMUM REQUIRED TIME PERIOD |
| 005 | 0~20km/h | 006 | 120 SEC. | 007 | 280 SEC. |
| 005 | 20~40km/h | 006 | 80 SEC. | 007 | 200 SEC. |
| 005 | 40~60km/h | 006 | 45 SEC. | 007 | 120 SEC. |
| 005 | ... | ... | ... | ... | ... |
| 006 | 0~20km/h | 007 | 160 SEC. | 008 | 220 SEC. |
| ... | ... | ... | ... | ... | ... |

220a  220b  220c  220d

ONBOARD SYSTEM AND EMERGENCY BRAKE CONTROL METHOD

CROSS REFERENCE TO RELATED APPLICATION

This application is a continuation of International Patent Application No. PCT/JP2016/079199, having an international filing date of Oct. 3, 2016, which designated the United States, the entirety of which is incorporated herein by reference.

BACKGROUND

A method of detecting traveling speed and traveling position of a train on the train includes a method of performing measurement based on a rotation detection signal from a detector such as a Pulse Generator (PG) and a Tachogenerator (TG) that detect rotation of a wheel or an axle. A traveling position measured based on the rotation detection signal includes a tolerance due to slip or skid of wheels. Thus, it is a common practice to measure the traveling position as a travel distance from a disposed position of a balise detected.

Then, on the train, speed control is performed including comparing the traveling speed measured with a checked speed defined by a speed check pattern, and activating a brake when the traveling speed exceeds the checked speed. JP-A-1994-327105 discloses one method for performing speed control, under a precondition that the traveling speed measured on the train is accurate. Specifically, an interval between detection timings for two balises is measured when a train stops to determine whether or not overspeed has occurred, and an emergency brake is activated when the overspeed has occurred.

The traveling speed and the traveling position is inaccurately measured on the train mainly due to the tolerances described above. The inaccurate measurement also occurs due to an abnormality of the detector, or an abnormality such as breakage of an axle or a propeller shaft to which the detector is attached. If occurrence of the abnormality cannot be detected, the traveling would be based on traveling control relying on measured traveling speed and traveling position, and this could be risky. For example, if the traveling speed measured on the train is slower than the actual traveling speed, overspeed which could even lead to derailment of the train might occur with the actual traveling speed exceeding the checked speed. The traveling position might be inaccurately measured and thus might be recognized as a position before the actual traveling position. As a result, the train might collide with a train ahead or the end of the track (car stop), of might enter an un-opened turnout to result in derailment. In this context, for example, a preferably employed method uses other means such as a Global Positioning System(GPS) or an acceleration meter, to monitor whether or not an abnormal value of the traveling speed and the traveling position overwhelming a tolerance is measured. However, the GPS cannot be used in a tunnel section or the like. Furthermore, additional equipment such as GPS and the acceleration meter would lead to a cost increase in the first place.

BRIEF DESCRIPTION OF DRAWINGS

FIG. 4 illustrates an example of a data structure of minimum required time period data.
FIG. 6 illustrates an example of a data structure of a minimum required time period table.

DESCRIPTION OF EXEMPLARY EMBODIMENTS

Figure 1:
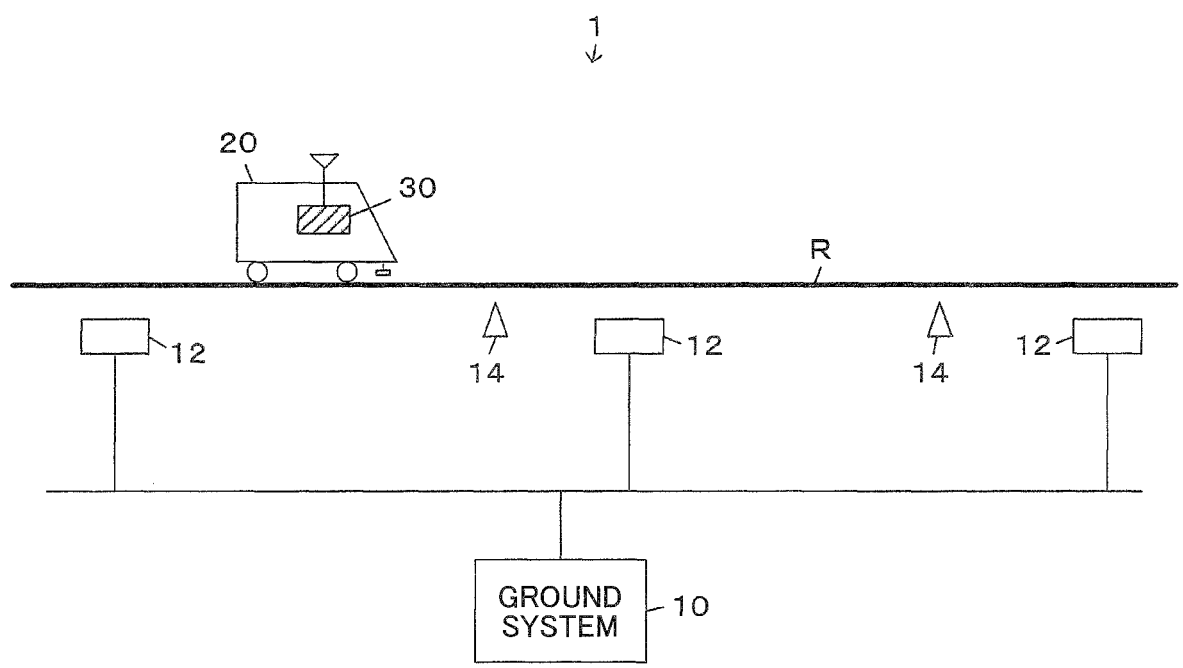
FIG. 1 illustrates a configuration example of a train control system.

The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected of coupled to each other with one or more other intervening elements in between.

The present embodiment is directed to enable detection of abnormal traveling speed of a train measured by an onboard system.

In accordance with one of some embodiments, there is provided an onboard system comprising: a storage section that stores a position of each of ground positions detectable by the onboard system when a train passes therethrough,
a measurement section that corrects a measured traveling position when each of the ground positions is detected;
a checked speed setting section that sets a checked speed corresponding to the measured traveling position;
a minimum required time period setting section that sets a minimum required time period for traveling from a current ground position as a last detected ground position to a next ground position as a ground position subsequent to the current ground position in a train traveling direction, by using a measured traveling speed at a timing of detecting the current ground position;
a time measurement section that measures an elapsed time period from the timing of detecting the current ground position; and
an emergency brake control section that activates an emergency brake when the next ground position is detected with the elapsed time period being shorter than the minimum required time period.

In accordance with one of some embodiments, there is provided an emergency brake control method performed by an onboard system of a train,
the onboard system comprising:
a storage section that stores a position of each of ground positions detectable by the onboard system when the train passes therethrough,
a measurement section that corrects a measured traveling position when each of the ground positions is detected;
a checked speed setting section that sets a checked speed corresponding to the measured traveling position;
the emergency brake control method comprising:
a minimum required time period setting step of setting a minimum required time period for traveling from a current ground position as a last detected ground position to a next ground position as a ground position subsequent to the current ground position in a train traveling direction, by using a measured traveling speed at a timing of detecting the current ground position;

a time measurement step of measuring an elapsed time period from the timing of detecting the current ground position; and an emergency brake control step of activating an emergency brake when the next ground position is detected with the elapsed time period being shorter than the minimum required time period.

Thus, according to some embodiment, the emergency brake can be activated by performing speed check with safety ensured, even when the measured traveling speed is inaccurate and this is of a value with low reliability. Specifically, at the timing when the next ground position is detected, the elapsed time period that is the traveling time period from the current ground position to the next ground position is compared with the minimum required time period, based on the measured traveling speed at the timing when the current ground position is detected, for traveling from the current ground position to the next ground position. The emergency brake is activated when the elapsed time period is shorter than the minimum required time period. Specifically, if the measured traveling speed is accurate and thus matches the actual traveling speed, the traveling time period (elapsed time period) from the current ground position to the next ground position would not be shorter than the minimum required time period. Still, if the measured traveling speed is slower than the actual traveling speed, the minimum required time period is set to be long resulting in the traveling time period (elapsed time period) being shorter than the minimum required time period to trigger the activation of the emergency brake.

In accordance with one of some embodiments, the onboard system wherein the minimum required time period setting section calculates a speed curve from the current ground position to the next ground position based on the measured traveling speed at the timing of detecting the current ground position, in a case where the train is accelerated at predetermined maximum acceleration, and sets the minimum required time period based on the speed curve.

Thus, according to some embodiments, the minimum required time period from the current ground position to the next ground position is set by calculating the speed curve for implementing traveling at the maximum acceleration based on the measured traveling speed at the timing of detecting the current ground position. The minimum required time period corresponding to traveling at the top speed from the current ground position to the next ground position can be set.

In accordance with one of some embodiments, the onboard system, wherein the checked speed setting section sets a speed check pattern defining checked speed for each traveling position; and the minimum required time period setting section calculates the speed curve by referring to the speed check pattern.

As a result, in some embodiments, the speed curve from the current ground position to the next ground position is calculated to implement traveling without overwhelming checked speed for each traveling position defined by the speed check pattern.

In accordance with one of some embodiments, the onboard system, wherein the minimum required time period setting section selects and sets one of minimum required time periods set in advance for respective speed from the current ground position to the next ground position based on the measured traveling speed at the timing of detecting the current ground position.

As a result, in some embodiments, the minimum required time period from the current ground position to the next ground position is set from minimum required time periods set for respective speeds, based on the measured traveling speed at the timing of detecting the current ground position. Thus, the minimum required time period can easily be set.

In accordance with one of some embodiments, the onboard system, wherein the minimum required time period setting section sets a second minimum required time period for traveling from the current ground position to a ground position subsequent to the next ground position, and the emergency brake control section activates the emergency brake when the ground position subsequent to the next ground position is detected without the next ground position detected, with the elapsed time period being shorter than the second minimum required time period.

As a result, in some embodiments, the speed check is performed at the timing of detecting the ground position subsequent to the next ground position when the next ground position fails to be detected after the current ground position is detected. Thus, appropriate control for activating the emergency brake as appropriate can be implemented.

Detailed exemplary embodiments are described below with reference to the drawings.

[System Configuration]

FIG. 1 is a diagram schematically illustrating a train control system 1 according to the present embodiment. As illustrated in FIG. 1, the train control system 1 includes a ground system 10 and an onboard system 30 installed in a train 20 that travels on a track R. The track R is provided with a plurality of balises 14 serving as ground positions.

For example, the ground system 10 is disposed in a central control room or the like, and controls the trains 20 on the track R. Specifically, control information is generated for each train 20 based on information, acquired for each track circuit provided to the track R, such as information on a traveling position of each train 20 (occupancy information) and route control information obtained from an interlocking device (not illustrated). The control information is transmitted to a rail of a corresponding occupancy section, via a transmitter 12 connected to a boundary on an exit side of the track circuit.

The onboard system 30 measures a traveling position (hereinafter, referred to as a "measured traveling position") and traveling speed (hereinafter, referred to as "measured traveling speed") of the corresponding train, based on speed pulses from a pulse generator (hereinafter, referred to as a "PG") attached to an axle. The measured traveling position is corrected each time the balise 14 is detected, based on the disposed position of the balise 14. Traveling control is performed for the train 20, based on the control information received from the rail. Specifically, the speed control is performed in accordance with a speed check pattern generated for stopping the train 20 at a stopping limit designated by the control information based on a speed limit section set to the track R, a gradient, and the vehicle performance of the train 20. Specifically, checked speed corresponding to the current measured traveling position defined by the speed check pattern is compared with the current measured traveling speed. When the measured traveling speed is higher than the checked speed, a service brake is activated to decelerate the corresponding train. This corresponds to normal speed check control.

[Principle]

The traveling speed (measured traveling speed) and the traveling position (measured traveling position) measured by the onboard system 30 might be of an abnormal value overwhelming a tolerance, that is, a value with a low reliability, due to inappropriateness of an attachment portion of the PG, breakage of an axle to which the PG is attached, and the like. To address this, in the present embodiment, characteristic speed check is performed in addition to the normal speed check based on the speed check pattern described above. In the description below, the normal speed check based on the speed check pattern is referred to as "speed control", and the characteristic speed check is simply referred to as "speed check".

Figure 2:
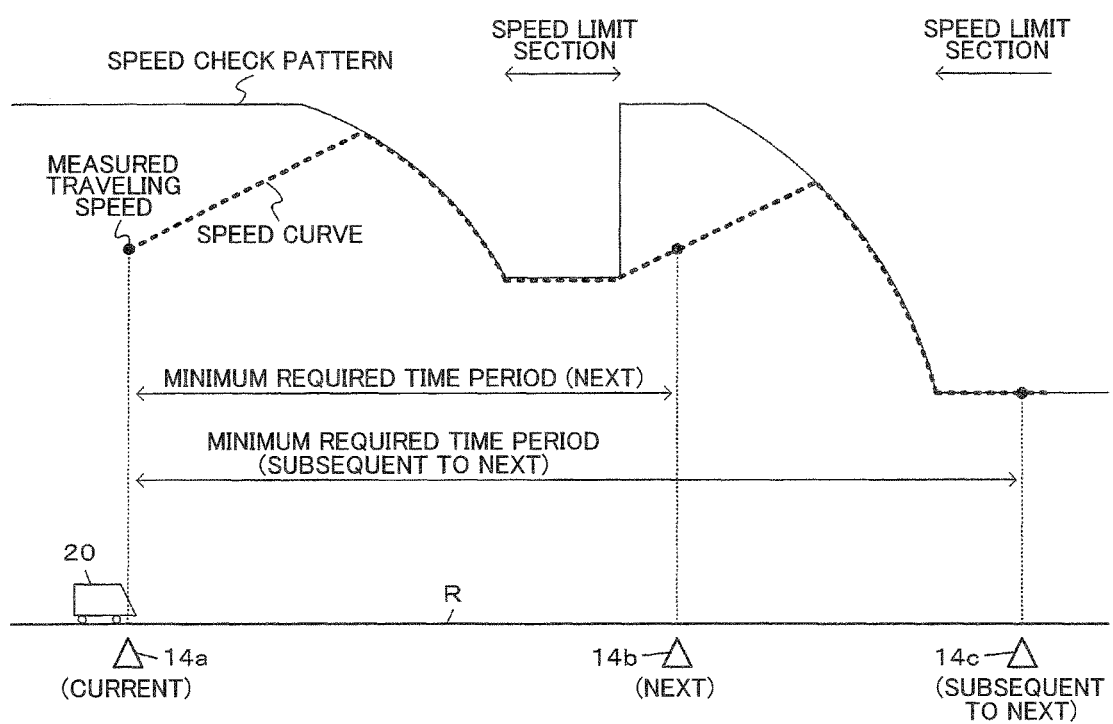
FIG. 2 is a diagram illustrating a principle of speed check.

FIG. 2 is a diagram illustrating the speed check (the characteristic speed check according to the present embodiment) performed by the onboard system 30. The balises 14 are arranged along the traveling direction of the train 20, on the track R. In FIG. 2, three balises 14a to 14c are disposed. The disposed positions of the balises 14a to 14c are known.

Upon detecting the balise 14a (current balise), the train 20 calculates a minimum required time period for traveling from the disposed position of the balise 14a to each of the balise 14b (next balise) and the balise 14c (balise subsequent to the next balise), based on the measured traveling speed at the timing of the detection. Specifically, the measured traveling speed at the timing of detecting the balise 14a is obtained as speed of the train passing through the disposed position of the balise 14a. Then, a speed curve is obtained that corresponds to traveling at the top speed with the maximum acceleration determined by the vehicle performance of the train 20, without overwhelming the checked speed defined by the speed check pattern. Then, the minimum required time period is calculated based on the speed curve, as a traveling time period required for the train 20 to reach the disposed position of each of the balises 14b and 14c.

Then, upon detecting the balise 14b, the train 20 obtains an elapsed time period between the timing of detecting the balise 14a and the timing of detecting the balise 14b, that is, a time period (inter-balise traveling time period) required for actual traveling between the timing of detecting the balise 14a and the timing of detecting the balise 14b. The inter-balise traveling time period is compared with the minimum required time period for the balise 14b. When the inter-balise traveling time period is shorter than the minimum required time period for the balise 14b, the emergency brake is activated to stop the train 20.

When the measured traveling speed is accurate and thus matches the actual traveling speed, the traveling time period from the balise 14a (current balise) to the balise 14b (next balise) would not be shorter than the minimum required time period. If the measured traveling speed is slower than the actual traveling speed, the minimum required time period is set to be long. As a result, the traveling time period becomes shorter than the minimum required time period. Thus, the speed check ensuring safety can be implemented even when the reliability of the measured traveling speed is low.

More specifically, if the measured traveling speed is slower than the actual traveling speed, the normal brake control (activation of the service brake) is performed in accordance with the speed control using the speed check based on the speed check pattern when the measured traveling speed exceeds the checked speed even if the actual traveling speed exceeds the checked speed (actual traveling speed>measured traveling speed>checked speed). The normal brake control (activation of the service brake) is not performed in accordance with the speed control using the speed check based on the speed check pattern when the measured traveling speed does not exceed the checked speed (actual traveling speed>checked speed>measured traveling speed). In such a case, if comparison between the actual inter-balise traveling period and the inter-balise minimum required time period based on the measured traveling speed serving as a threshold is performed, the minimum required time period is set to be long and thus might be longer than the actual traveling time period because the measured traveling speed is slower than the actual traveling speed. Thus, the emergency brake can be activated with the measured traveling speed determined as an abnormal value that has a negative impact on safety.

When the actual traveling speed exceeds the checked speed with the measured traveling speed being faster than the actual traveling speed, the measured traveling speed also exceeds the checked speed (measured traveling speed>actual traveling speed>checked speed), and thus the normal brake control (activation of the service brake) is performed in accordance with the speed control using the speed check based on the speed check pattern. In such a case, the measured traveling speed is faster than the actual traveling speed, and thus the minimum required time period is set to be short and might be longer than the actual traveling time period. Thus, the emergency brake might be activated due measured traveling speed of an abnormal value, but this abnormal value does not have a negative impact on safety and thus would not compromise safety.

Detection failure might also occur with the train passing through the balise 14 failing to detect the balise 14. Specifically, in FIG. 2, the train that has detected the balise 14a might fail to detect the balise 14b. Still, the minimum required time period to each of the balise 14b and the balise 14c is calculated at the timing of detecting the balise 14a. Thus, at the timing of detecting the balise 14c, the situation can be dealt with the comparison between the inter-balise traveling time period between the balise 14a and the balise 14c and the minimum required time period between the balise 14a and the balise 14c. The process itself is the same as that for the speed check for the balise 14b, but is performed for the balise 14c in this case.

[Functional Configuration]

Figure 3:
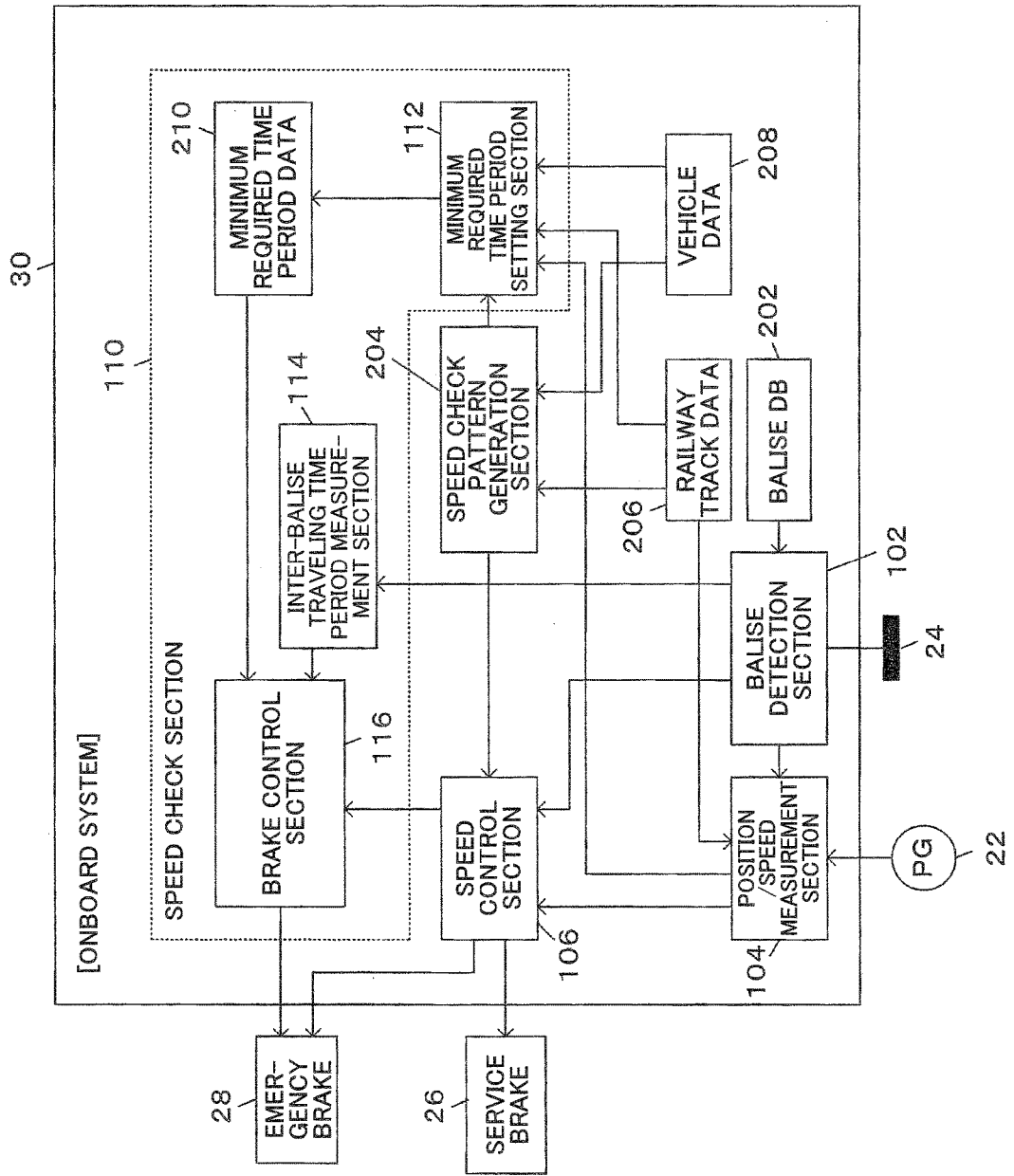
FIG. 3 is a diagram illustrating a functional configuration of an onboard system.

FIG. 3 is a diagram illustrating a functional configuration of the onboard system 30. As illustrated in FIG. 3, functional units of the onboard system 30 include a balise detection section 102, a position/speed measurement section 104, a speed check pattern generation section 204, a speed control section 106, and a speed check section 110, as well as a balise database (DB) 202, railway track data 206, and vehicle data 208.

When the train passes through the disposed position of the balise 14, the balise detection section 102 performs near-field wireless communications with the balise 14 through an onboard antenna 24 to receive a balise ID, and identifies the balise 14 through which the train has passed by referring to the balise DB 202. This act of identifying the balise 14 using the balise ID is referred to as "detection" of the balise. The balise detection section 102 receives the control information from the balise 14, and outputs this information to the speed control section 106. The balise DB 202 stores therein a balise ID, a disposed position, and the like, associated with each other, for each of the balises 14 disposed along the track R.

The position/speed measurement section 104 measures the traveling speed (measured traveling speed) and the traveling position (measured traveling position) of the train 20 based on speed pulses output from a PG 22 attached to an axle. When the balise detection section 102 detects the balise 14, the traveling position measured at the disposed position of the balise 14 is corrected.

The speed check pattern generation section 204 generates the speed check pattern for stopping the train 20 at the stop limit designated by the control information from the ground system 10, based on a condition of the track R, the traveling performance of the train 20, and the like. The speed control section 106 compares the checked speed corresponding to the current measured traveling position defined by the speed check pattern with the current measured traveling speed. When the measured traveling speed is higher than the checked speed, the speed control of activating the service brake 26 to decelerate the train 20 is performed.

The speed check section 110 includes a minimum required time period setting section 112, an inter-balise traveling time period measurement section 114, and a brake control section 116, and performs the speed check described above (the characteristic speed check according to the present embodiment) when the balise detection section 102 detects the balise 14.

When the balise 14 is detected, the minimum required time period setting section 112 sets the minimum required time period for reaching the disposed position of each of the next balise 14 and the balise 14 subsequent to the next balise 14 in the traveling direction of the train 20 from the disposed position of the balise 14 (current balise). Specifically, under an assumption that the train has passed through the disposed position of the current balise at the measured traveling speed at the timing of detecting the current balise, the speed curve of the train 20 traveling at the top speed without overwhelming the checked speed defined by the speed check pattern and accelerated at the maximum acceleration of the train 20 defined by the vehicle data 208 is obtained based on the speed limit of the track R determined by the railway track data 206 and gradient. Then, based on the speed curve, the traveling time period required for the train 20 to reach the disposed position of each of the next balise and the balise subsequent to the next balise from the disposed position of the current balise is set as the minimum required time period. The disposed position of each of the current balise, the next balise, and the balise subsequent to the next balise can be acquired by referring to the balise DB 202. The minimum required time period set is stored as minimum required time period data 210.

FIG. 4 illustrates an example of a data structure of the minimum required time period data 210. As illustrated in FIG. 4, the minimum required time period data 210 stores a balise ID 210a and a minimum required time period 210b from the current balise associated with each other, for each of the current balise, the next balise, and the balise subsequent to the next balise. The minimum required time period setting section 112 sets the minimum required time period with the balise 14 last detected serving as the current balise, each time the balise 14 is detected. Thus, the minimum required time period data 210 is updated each time the balise 14 is detected.

The inter-balise traveling time period measurement section 114 measures the traveling time period between two balises 14 sequentially detected. Thus, when the balise 14 is detected, measurement for the elapsed time period from the timing of the detection of the last detected balise 14 starts, and the elapsed time period to the timing of detecting the next balise 14 is set as the inter-balise traveling time period.

When the balise 14 is detected, the brake control section 116 compares the inter-balise traveling time period measured by the inter-balise traveling time period measurement section 114 with the minimum required time period corresponding to the detected balise 14 stored in the minimum required time period data 210. When the inter-balise traveling time period is shorter than the minimum required time period, an emergency brake 28 is activated to stop the train 20.

[Process Flow]

Figure 5:
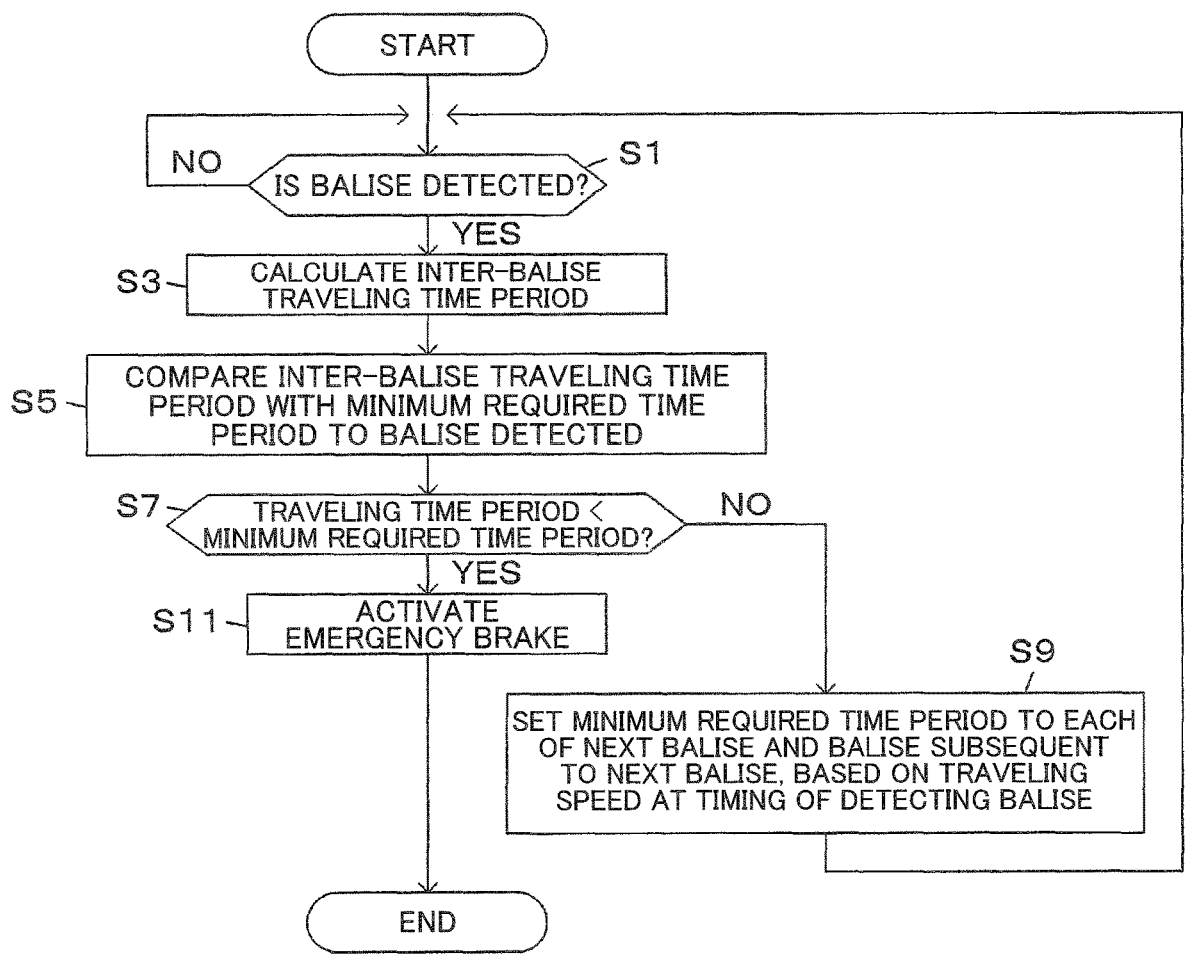
FIG. 5 is a flowchart illustrating a speed check process.

FIG. 5 is a flowchart illustrating a flow of a speed check process. This process is performed by the speed check section 110.

In the speed check process, when the balise 14 is detected (step S1: YES), the inter-balise traveling time period measurement section 114 sets the elapsed time period at the timing of detecting the balise 14 as the inter-balise traveling time period, and starts measuring the elapsed time period from the new detection timing (step S3). Next, the brake control section 116 compares the inter-balise traveling time period with the minimum required time period to the balise 14 detected (step S5).

When a result of the comparison indicates that the inter-balise traveling time period is equal to or longer than the minimum required time period (step S7: NO), the minimum required time period setting section 112 calculates the minimum required time period to each of the next balise and the balise subsequent to the next balise in the traveling direction of the train 20, based on the measured traveling speed at the timing of detecting the last detected balise 14 (step S9). Then, the process returns to step S1, and the similar process is repeated. On the other hand, when the inter-balise traveling time period is shorter than the minimum required time period (step S7: YES), the emergency brake 28 is activated to stop the train 20 (step S11).

[Operation and Effect]

With the present embodiment described above, the speed check can be implemented with safety ensured, even when the measured traveling speed, calculated based on the rotation detection signal detected by a detector such as the PG 22 or a TG for a wheel or an axle is of a value with low reliability.

Specifically, at the timing of detecting the current balise (balise 14a), the inter-balise traveling time period between the current balise and the next balise (balise 14b) is compared with the minimum required time period for traveling from the current balise to the next balise based on the measured traveling speed at the timing of detecting the current balise. If the inter-balise traveling time period is shorter than the minimum required time period, the emergency brake is activated for the following reason. Specifically, if the measured traveling speed is accurate and thus matches the actual traveling speed, the inter-balise traveling time period from the current balise to the next balise would not exceed the minimum required time period. However, if the measured traveling speed exceeds the actual traveling speed, the measured traveling time period would be shorter than the minimum required time period.

[Modification]

The aspects of the present disclosure are not limited to the above embodiments. Various modifications and variations may be made without departing from the provided subject matter.

(A) Minimum Required Time Period

For example, the minimum required time period may be set by referring to a data table stored in advance, instead of calculating and setting the minimum required time period each time a balise is detected. Specifically, the minimum required time period table 220 as illustrated in FIG. 6 is stored in the onboard system 30 in advance. The minimum required time period table 220 stores traveling speed 220b as well as a balise ID and a minimum required time period of each of a next balise 220c and a balise subsequent to the next balise 220d, in association with a current balise 220a. The current balise 220a is for all the balises 14 disposed along the track R. The minimum required time period between balises varies in accordance with the traveling speed of the train 20, and thus the minimum required time period is stored in association with each of a plurality of ranges of the traveling speed 220b.

When the balise 14 is detected, the minimum required time period setting section 112 selects from the minimum required time period table 220, the minimum required time period corresponding to the measured traveling speed at the detection timing and the current balise that is the balise 14 detected, to be set as the minimum required time period to each of the next balise and the balise subsequent to the next balise.

(B) Ground Position

In the embodiment described above, the balise 14 serves as the ground position. Alternatively, the ground position may be any known position that is fixedly provided along the track R and can be detected on the train, instead of the balise 14. For example, a boundary of a track circuit disposed on the track R may serve as the ground position. When the train passes through the track circuit boundary, the frequency and the content of a signal received from a rail change. Thus, the onboard system 30 may detect the track circuit boundary based on the change in the received signal, and compare the traveling time period between two track circuit boundaries with the minimum required time period.

(C) Traveling Speed Measurement

In the embodiment described above, the traveling speed is measured on the train based on speed pulses from the PG. Alternatively, the measurement may be performed based on output voltage from a TG, or may be performed by a Doppler speed meter that receives reflected waves of electric waves emitted toward the track, and measures the traveling speed based on the Doppler effect of the received signal.

What is claimed is:

1. An onboard system comprising: a storage section that stores a position of each of ground positions detectable by the onboard system when a train passes therethrough,
   a measurement section that measures a measured traveling speed and a measured traveling position and corrects the measured traveling position when each of the ground positions is detected;
   a checked speed setting section that sets a checked speed corresponding to the measured traveling position;
   a minimum required time period setting section that sets a minimum required time period for traveling from a current ground position as a last detected ground position to a next ground position as a ground position subsequent to the current ground position in a train traveling direction, by using the measured traveling speed at a timing of detecting the current ground position;
   a time measurement section that measures an elapsed time period from the timing of detecting the current ground position; and
   an emergency brake control section that
      determines whether the measured traveling speed at the current ground position is less than the checked speed corresponding to the current ground position regardless of whether the measured traveling speed is inaccurate or not,
      in response to an affirmative determination that the measured traveling speed at the current ground position is less than the checked speed corresponding to the current ground position, determines whether the next ground position is detected with the elapsed time period being shorter than the minimum required time period, and
      in response to an affirmative determination that the next ground position is detected with the elapsed time period being shorter than the minimum required time period, activates an emergency brake.

2. The onboard system as defined in claim 1, wherein the minimum required time period setting section calculates a speed curve from the current ground position to the next ground position based on the measured traveling speed at the timing of detecting the current ground position, in a case where the train is accelerated at predetermined maximum acceleration, and sets the minimum required time period based on the speed curve.

3. The onboard system as defined in claim 2, wherein the checked speed setting section sets a speed check pattern defining checked speed for each traveling position; and
   the minimum required time period setting section calculates the speed curve by referring to the speed check pattern.

4. The onboard system as defined in claim 3, wherein the minimum required time period setting section sets a second minimum required time period for traveling from the current ground position to a ground position subsequent to the next ground position, and
   the emergency brake control section activates the emergency brake when the ground position subsequent to the next ground position is detected without the next ground position detected, with the elapsed time period being shorter than the second minimum required time period.

5. The onboard system as defined in claim 2, wherein the minimum required time period setting section sets a second minimum required time period for traveling from the current ground position to a ground position subsequent to the next ground position, and
   the emergency brake control section activates the emergency brake when the ground position subsequent to the next ground position is detected without the next ground position detected, with the elapsed time period being shorter than the second minimum required time period.

6. The onboard system as defined in claim 1, wherein the minimum required time period setting section selects and sets one of minimum required time periods set in advance for respective speed from the current ground position to the next ground position based on the measured traveling speed at the timing of detecting the current ground position.

7. The onboard system as defined in claim 6, wherein the minimum required time period setting section sets a second minimum required time period for traveling from the current ground position to a ground position subsequent to the next ground position, and
   the emergency brake control section activates the emergency brake when the ground position subsequent to the next ground position is detected without the next ground position detected, with the elapsed time period being shorter than the second minimum required time period.

8. The onboard system as defined in claim 1, wherein the minimum required time period setting section sets a second minimum required time period for traveling from the current ground position to a ground position subsequent to the next ground position, and the emergency brake control section activates the emergency brake when the ground position subsequent to the next ground position is detected without the next ground position detected, with the elapsed time period being shorter than the second minimum required time period.

9. An emergency brake control method performed by an onboard system of a train, the onboard system comprising:

a storage section that stores a position of each of ground positions detectable by the onboard system when the train passes therethrough, a measurement section that measures a measured traveling speed and a measured traveling position and corrects the measured traveling position when each of the ground positions is detected;

a checked speed setting section that sets a checked speed corresponding to the measured traveling position;

the emergency brake control method comprising:

a minimum required time period setting step of setting a minimum required time period for traveling from a current ground position as a last detected ground position to a next ground position as a ground position subsequent to the current ground position in a train traveling direction, by using the measured traveling speed at a timing of detecting the current ground position;

a time measurement step of measuring an elapsed time period from the timing of detecting the current ground position; and an emergency brake control step of:

determining whether the measured traveling speed at the current ground position is less than the checked speed corresponding to the current ground position regardless of whether the measured traveling speed is inaccurate or not, in response to an affirmative determination that the measured traveling speed at the current ground position is less than the checked speed corresponding to the current ground position, determining whether the next ground position is detected with the elapsed time period being shorter than the minimum required time period, and in response to an affirmative determination that the next ground position is detected with the elapsed time period being shorter than the minimum required time period, activating an emergency brake.

10. The emergency brake control method as defined in claim 9, further comprising calculating a speed curve from the current ground position to the next ground position based on the measured traveling speed at the timing of detecting the current ground position, in a case where the train is accelerated at predetermined maximum acceleration, and sets the minimum required time period based on the speed curve.

11. The emergency brake control method as defined in claim 10, wherein the checked speed setting section sets a speed check pattern defining checked speed for each traveling position; and the emergency brake control method further calculates the speed curve by referring to the speed check pattern.

12. The emergency brake control method as defined in claim 11, further comprising:

setting a second minimum required time period for traveling from the current ground position to a ground position subsequent to the next ground position, and activating the emergency brake when the ground position subsequent to the next ground position is detected without the next ground position detected, with the elapsed time period being shorter than the second minimum required time period.

13. The emergency brake control method as defined in claim 10, further comprising:

setting a second minimum required time period for traveling from the current ground position to a ground position subsequent to the next ground position, and activating the emergency brake when the ground position subsequent to the next ground position is detected without the next ground position detected, with the elapsed time period being shorter than the second minimum required time period.

14. The emergency brake control method as defined in claim 9, further comprising selecting and setting one of minimum required time periods set in advance for respective speed from the current ground position to the next ground position based on the measured traveling speed at the timing of detecting the current ground position.

15. The emergency brake control method as defined in claim 14, further comprising:

setting a second minimum required time period for traveling from the current ground position to a ground position subsequent to the next ground position, and activating the emergency brake when the ground position subsequent to the next ground position is detected without the next ground position detected, with the elapsed time period being shorter than the second minimum required time period.

16. The emergency brake control method as defined in claim 9, further comprising:

setting a second minimum required time period for traveling from the current ground position to a ground position subsequent to the next ground position, and activating the emergency brake when the ground position subsequent to the next ground position is detected without the next ground position detected, with the elapsed time period being shorter than the second minimum required time period.

\* \* \* \* \*